US010177653B2

(12) United States Patent
Sassene et al.

(10) Patent No.: US 10,177,653 B2
(45) Date of Patent: Jan. 8, 2019

(54) IMPEDANCE CIRCUIT FOR A CHARGE PUMP ARRANGEMENT AND CHARGE PUMP ARRANGEMENT

(71) Applicant: TDK Corporation, Tokyo (JP)

(72) Inventors: Daifi Haoues Sassene, Vaerlöse (DK); Gino Rocca, Copenhagen (DK); Tomasz Hanzlik, Szczecin (PL)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/543,948

(22) PCT Filed: Jan. 20, 2015

(86) PCT No.: PCT/EP2015/050993
§ 371 (c)(1),
(2) Date: Jul. 14, 2017

(87) PCT Pub. No.: WO2016/116138
PCT Pub. Date: Jul. 28, 2016

(65) Prior Publication Data
US 2018/0006553 A1    Jan. 4, 2018

(51) Int. Cl.
*H02M 3/07* (2006.01)
*H04R 3/00* (2006.01)
*H04R 19/04* (2006.01)

(52) U.S. Cl.
CPC .............. *H02M 3/07* (2013.01); *H04R 3/00* (2013.01); *H04R 19/04* (2013.01); *H04R 2201/003* (2013.01); *H04R 2410/03* (2013.01)

(58) Field of Classification Search
CPC ............ H02M 3/07; H02M 1/32; H02M 1/14; H02M 1/08; H02M 3/04; H04R 19/04; H04R 3/00; H04R 2201/003; H04R 2410/03
USPC .......................................... 327/156, 158, 536
See application file for complete search history.

(56) References Cited

U.S. PATENT DOCUMENTS

| 2009/0289726 | A1* | 11/2009 | Peng ..................... H03L 7/0893 331/17 |
| 2011/0006952 | A1 | 1/2011 | Ayatollahi et al. |
| 2012/0154000 | A1* | 6/2012 | Tabata .................... H03L 7/089 327/157 |

(Continued)

FOREIGN PATENT DOCUMENTS

EP    2299576 A1    3/2011

OTHER PUBLICATIONS

Dickson, J., et al., "On-Chip High-Voltage Generation in MNOS Integrated Circuits Using an Improved Voltage Multiplier Technique," vol. SC-11, No. 3, Jun. 1, 1976, pp. 374-378.

*Primary Examiner* — John W Poos
(74) *Attorney, Agent, or Firm* — Slater Matsil, LLP

(57) ABSTRACT

An impedance circuit for a charge pump arrangement and a charge pump arrangement are disclosed. In an embodiment, the impedance circuit includes a first current mirror circuit with a first bias serving as a current input terminal, a first output serving as a current output terminal and a first input for coupling with a pre-selected potential. The impedance circuit further includes a first charge pump for biasing the first current mirror circuit with a first reference current, wherein the first charge pump includes a first biasing output coupled with the first bias of the first current mirror circuit.

20 Claims, 3 Drawing Sheets

(56) References Cited

U.S. PATENT DOCUMENTS

2012/0280744 A1* 11/2012 Hsieh ..................... H02M 3/07
  327/536
2014/0003609 A1  1/2014 Rombach et al.

* cited by examiner

IMPEDANCE CIRCUIT FOR A CHARGE PUMP ARRANGEMENT AND CHARGE PUMP ARRANGEMENT

This patent application is a national phase filing under section 371 of PCT/EP2015/050993, filed Jan. 20, 2015, which is incorporated herein by reference in its entirety.

TECHNICAL FIELD

The invention relates to an impedance circuit for a charge pump arrangement and the charge pump arrangement.

BACKGROUND

Fully integrated charge pumps are used in a wide variety of applications, such as flash memories, dedicated display drivers and DC bias voltage generation for condenser microphones.

Condenser microphones such as single or double backplate micro-electro-mechanical systems devices (MEMS devices) need a high voltage charge pump. In integrated circuit designs of today, the charge pump is typically operated by a set of non-overlapping clock signals. Charge pumps for bias voltages for MEMS microphones build up their final voltage by charge accumulation on capacitors via diodes under the control of two or more non-overlapping clocks. This results in a voltage ripple on an output voltage which needs to be reduced to a level that will not introduce additional noise or deteriorate an overall power supply noise rejection (PSR) when interfacing the microphone, such as the MEMS microphone, to a preamplifier.

The voltage ripple may be reduced by filtering. For the filtering a low pass RC-filter may be used. Since there is a direct coupling from the charge pump to an input of the preamplifier of the condenser microphone, a high impedance is required to obtain a sufficient signal-to-noise ratio (SNR).

As the resistance values and the capacity values might be very large for integration, today, most filtering is based on poly-diodes in a back-to-back, anti-parallel, configuration.

US 2014/0003609 A1 shows a circuit arrangement for driving a MEMS microphone. The circuit arrangement comprises a charge pump. The charge pump is interconnected with the MEMS microphone via a first path. In the first path two oppositely connected diodes D1 and D2 are arranged. The first path splits into two parallel sub-paths UP1 and UP2, wherein in each case one of the two oppositely connected diodes D1 and D2 is arranged in each sub-path UP1 and UP2. These two sub-paths UP1, UP2 form a high impedance element.

However, the process variation and temperature variation of these filter devices based on poly-diodes is very high. In particular, poly-diodes-based circuits are often not sufficiently reliable over a required temperature range and have a wide range of parameter variation due to process variation.

SUMMARY OF THE INVENTION

Embodiments of the invention provide an impedance circuit for a charge pump arrangement and the charge pump arrangement which allows for cost-effective manufacturing and reliable operation of the impedance circuit and the charge pump arrangement, in particular, a reliable operation of the impedance circuit and the charge pump arrangement over a wide temperature range.

According to a first aspect, the disclosure is distinguished by an impedance circuit for a charge pump arrangement. The impedance circuit comprises a first current mirror circuit with a first bias serving as a current input terminal, a first output serving as a current output terminal and a first input for coupling with a pre-selected potential. Furthermore the impedance circuit comprises a first charge pump for biasing the first current mirror circuit with a first reference current, wherein the first charge pump comprises a first biasing output coupled with the first bias of the first current mirror circuit. Advantageously current mirror circuits have a very high output resistance. The output resistance of current mirror circuits depends on a reference current. The smaller the reference current, the higher the output resistance. A charge pump allows for providing a very small output current because of its high output impedance. Due to the fact that all or nearly all parameters of the charge pump are quite well determined, the impedance circuit is less prone to process and temperature variations. The very high output resistance allows for a cleaner filtering of a desired output voltage, for instance, of a charge pump of the charge pump arrangement.

According to one embodiment of the first aspect, the impedance circuit comprises a second current mirror circuit with a second bias serving as a current input terminal, a second output serving as a current output terminal and a second input for coupling with the pre-selected potential. Furthermore the impedance circuit comprises a second charge pump for biasing the second current mirror circuit with a second reference current, wherein the second charge pump comprises a second biasing output coupled with the second bias of the second current mirror circuit.

Advantageously, by such an arrangement, two sub-paths form a high impedance element. In this way a resistance arrangement of two oppositely connected diodes D1 and D2 may be emulated. Existing circuit designs, for instance for filter and/or MEMS microphone arrangements, may be maintained.

According to a further embodiment of the first aspect, the first charge pump and/or the second charge pump are configured to provide the first reference current and/or the second reference current with an absolute value equal to or smaller than 1 nA for biasing the first current mirror circuit and/or the second current mirror circuit, respectively. Due to the small current, the first current mirror circuit and the second current mirror circuit each may comprise an output resistance with a resistance value beyond several gigaohms, such as 100 GOhm, 500 GOhm and 1 TOhm.

According to a further embodiment of the first aspect, the first current mirror circuit comprises transistors of a first type of a semiconductor transistor technology and the second current mirror circuit comprises transistors of a second type of the semiconductor transistor technology, wherein the transistors of the first type are complementary to the transistors of the second type. This simplifies the emulation of the resistance arrangement of the two oppositely connected diodes D1 and D2. Also a very symmetrical layout design of the circuits may be achieved, which further reduces process and temperature variations.

According to a further embodiment of the first aspect, the first current mirror circuit and/or the second current mirror circuit are based on metal-oxide-semiconductor field-effect transistors, MOSFETs, operated in weak inversion. Advantageously, in this way the power consumption may be kept low.

According to a further embodiment of the first aspect, the first current mirror circuit comprises NMOS transistors and the second current mirror circuit comprises PMOS transistors. In particular, the first current mirror circuit is based on NMOS transistors and second current mirror circuit is based on PMOS transistors. This simplifies the emulation of the resistance arrangement of the two oppositely connected diodes D1 and D2. Also a very symmetrical layout design of the circuits may be achieved, which further reduces process and temperature variations.

According to a further embodiment of the first aspect, the first current mirror circuit comprises a first NMOS transistor comprising a gate electrode, a drain electrode serving as the current input terminal of the first current mirror circuit, and a source electrode connectable to a pre-selected potential. Furthermore the first current mirror circuit comprises an NMOS transistor block comprising a second NMOS transistor and at least one further NMOS transistor, the second NMOS transistor and the at least one further NMOS transistor being arranged in series, wherein the NMOS transistor block comprises a gate contact coupled with the gate and drain electrodes of the first NMOS transistor, a drain contact serving as the current output terminal of the first based current mirror circuit, and a source contact connectable to the pre-selected potential. Preferably the transistor block comprises a plurality of NMOS transistors being arranged in series. This allows for downscaling the first reference current provided at the current input terminal. The minimal number of NMOS transistors of the NMOS transistor block is determined by a desired output resistance.

According to a further embodiment of the first aspect, the second current mirror circuit comprises a first PMOS transistor comprising a gate electrode, a drain electrode serving as the current input terminal of the second current mirror circuit, and a source electrode connectable to the pre-selected potential. Furthermore the second current mirror circuit comprises a PMOS transistor block comprising a second PMOS transistor and at least one further PMOS transistor, the second PMOS transistor and the at least one further PMOS transistor being arranged in series, wherein the PMOS transistor block comprises a gate contact coupled with the gate and drain electrodes of the first PMOS transistor, a drain contact serving as the current output terminal of the second current mirror circuit, and a source contact connectable to the pre-selected potential.

According to a further embodiment of the first aspect, the first charge pump and/or the second charge pump each comprises a multitude of identical stages, each comprising a diode and a pumping capacitor, wherein the capacitors in consecutive stages are driven by at least two non-overlapping clock signals. Thus, the first and/or second charge pump comprise a Dickson-based charge pump. Advantageously the first charge pump and the second charge pump each comprise the high output resistance and deliver a small first and second reference current, respectively. The first reference current and the second reference current each depend on a frequency of the clock signals, the capacity of the pumping capacitor, the number of stages and a power supply of the first charge pump and the second charge pump, respectively. Due to the fact that all parameters of the charge pump are quite well determined, the impedance circuit is less prone to process and temperature variations.

According to a further embodiment of the first aspect, the impedance circuit comprises a device input and a device output, and the first output of the first current mirror circuit and the second output of the second current mirror circuit are coupled with the device output, and the first input of the first current mirror circuit and the second input of the second current mirror are coupled with the device input. Thus, the first current mirror circuit and the second current mirror circuit are coupled anti-parallel and provide two sub-paths.

According to a second aspect, the disclosure is distinguished by a charge pump arrangement. The charge pump arrangement comprises a main charge pump configured to provide a given output voltage. Furthermore the charge pump arrangement comprises a filter element configured to filter the output voltage of the main charge pump. The filter element comprises an impedance circuit according to the first aspect.

Advantageous embodiments of the first aspect are also valid for the second aspect.

In particular, the main charge pump is configured to provide a desired DC output voltage for supplying an electronic device, for instance a MEMS microphone. The filter element allows for reducing a voltage ripple of the output voltage such that no or nearly no noise is introduced, in particular, to a preamplifier of the MEMS microphone. The high impedance of the impedance circuit is guaranteed by design and provides an extremely low and negligible noise contribution to a residual circuit. Thus, a signal-to-noise ratio and a power supply noise rejection (PSR) are improved compared to arrangements with filter elements using resistors or poly-diodes.

BRIEF DESCRIPTION OF THE DRAWINGS

Exemplary embodiments of the invention are explained in the following with the aid of schematic drawings. These are as follows.

Elements of the same design and function that appear in different figures are identified by the same reference numerals.

DETAILED DESCRIPTION OF ILLUSTRATIVE EMBODIMENTS

Figure 1:
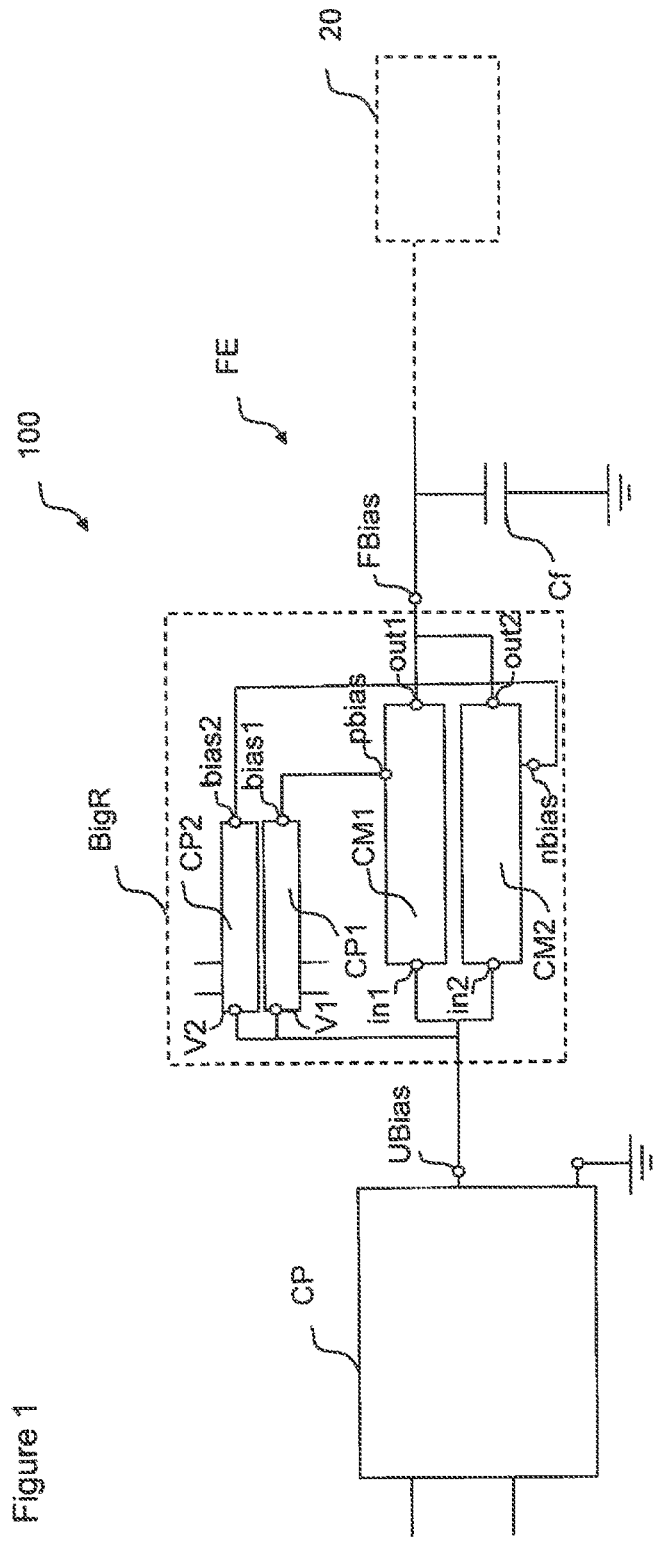
FIG. 1 is a block diagram exemplifying a charge pump arrangement.

FIG. 1 exemplifies a charge pump arrangement 100 for driving, e.g., a micro-electro-mechanical systems (MEMS) microphone 20.

The charge pump arrangement 100 comprises a main charge pump CP. The main charge pump CP is configured to provide a given output voltage on its output UBias, preferably a DC output voltage. Preferably the charge pump arrangement 100 comprises a control unit (not shown), which controls the main charge pump CP and which adjusts the DC output voltage provided by the main charge pump CP. The main charge pump CP is coupled with the MEMS microphone 20 via a main path.

The charge pump arrangement 100 comprises a filter element FE. The filter element FE is arranged in the main path.

The filter element FE is configured to reduce a voltage ripple on the output voltage of the main charge pump CP to a level that will not introduce additional noise or deteriorate a power supply noise rejection (PSR). Preferably the filter element FE is a low-pass filter. For instance, the filter element FE comprises an RC-filter characteristic. In particular, the filter element FE comprises a filter capacitor Cf.

The filter element FE comprises an impedance circuit BigR. The impedance circuit BigR comprises a first current mirror circuit CM1 with a first bias pbias serving as a current input terminal, a first output out1 serving as a current output terminal, and a first input in1 for coupling with a pre-selected potential. Furthermore the impedance circuit BigR comprises a first charge pump CP1 for biasing the first current mirror circuit CM1 with a first reference current, wherein the first charge pump CP1 comprises a first biasing output bias1 coupled with the first bias pbias of the first current mirror circuit CM1.

Preferably, the impedance circuit BigR comprises a second current mirror circuit CM2 with a second bias nbias serving as a current input terminal, a second output out2 serving as a current output terminal, and a second input in2 for coupling with the pre-selected potential. Furthermore the impedance circuit BigR comprises a second charge pump CP2 for biasing the second current mirror circuit CM2 with a second reference current, wherein the second charge pump CP2 comprises a second biasing output bias2 coupled with the second bias nbias of the second current mirror circuit CM2.

To ensure good stability of the output impedance of the first current mirror circuit CM1 and/or the second current mirror circuit CM2, the first reference current and the second reference current for biasing the first and second current mirror circuit CM1, CM2, respectively, each is provided very precisely and with small values. These requirements may be fulfilled by the first and/or second charge pump CP1, CP2. The first and/or second charge pump CP1, CP2 is/are configured to provide the biasing by providing constant voltages on the first and second biasing output bias1, bias2, respectively.

Thus, the filtering of the output voltage of the main charge pump CP may be based on an RC-filtering principle by emulating a big ohmic resistance using current mirror circuits. In order to address the back-to-back configuration of a diode arrangement, in particular, a poly-diode arrangement, the first current mirror circuit CM1 may comprise transistors of a first type of a semiconductor transistor technology and the second current mirror circuit CM2 may comprise transistors of a second type of this semiconductor transistor technology, wherein the transistors of the first type are complementary to the transistors of the second type.

Figure 2:
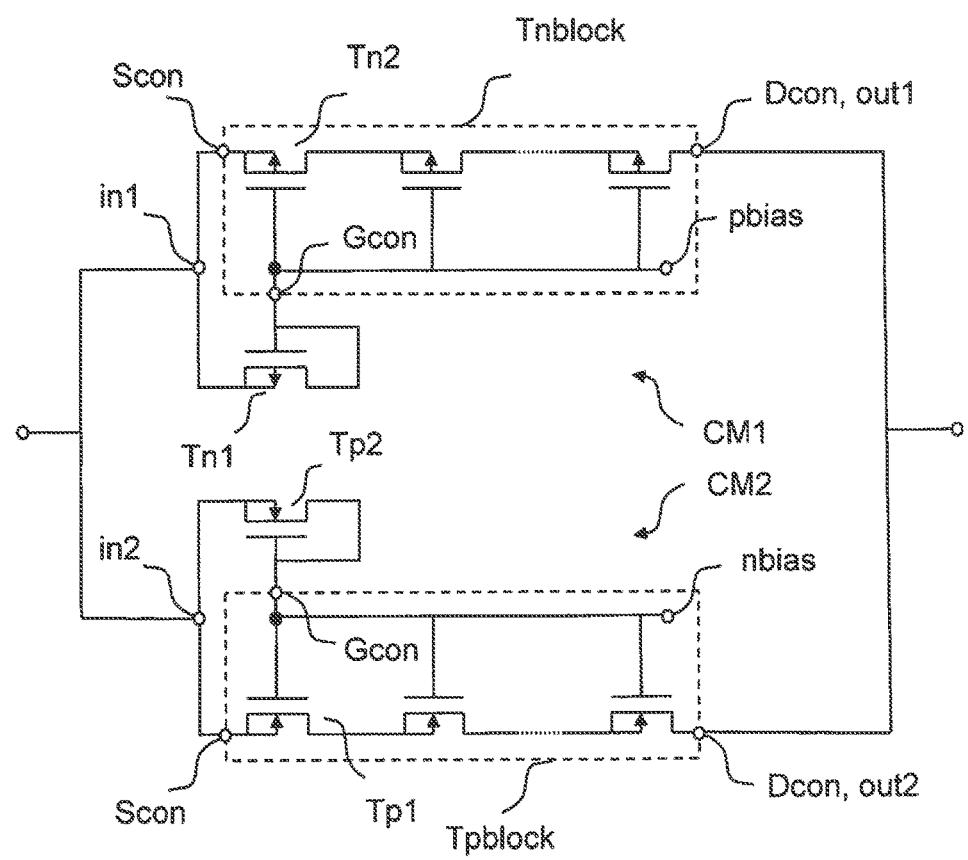
FIG. 2 is a block diagram of an exemplary embodiment of a first and second current mirror circuit and FIG. 3 is a block diagram of an exemplary embodiment of the first and the second charge pump.

FIG. 2 shows an exemplary embodiment of the first and second current mirror circuits CM1, CM2.

In various embodiments, the first current mirror circuit CM1 and/or the second current mirror circuit CM2 is/are based on metal-oxide-semiconductor field-effect transistors, MOSFETs.

In particular, the MOSFETs of the first and second current mirror circuits CM1, CM2 may be operated in weak inversion.

The first current mirror circuit CM1, for instance, comprises a first NMOS transistor Tn1 comprising a gate electrode, a drain electrode serving as the current input terminal of the first current mirror circuit CM1, and a source electrode connectable to a pre-selected potential. Furthermore the first current mirror circuit CM1 comprises an NMOS transistor block Tnblock comprising a second NMOS transistor Tn2 and at least one further NMOS transistor, the second NMOS transistor Tn2 and the at least one further NMOS transistor being arranged in series. Arranged in series means, for example, that a drain electrode of the second NMOS transistor Tn2 is coupled with a source electrode of a third NMOS transistor, and a gate electrode of the second NMOS transistor Tn2 and a gate electrode of the third transistor are coupled etc.

The NMOS transistor block Tnblock comprises a gate contact Gcon coupled with the gate and drain electrodes of the first NMOS transistor Tn1, a drain contact Dcon serving as the current output terminal of the first current mirror circuit CM1, and a source contact Scon connectable to the pre-selected potential. Preferably the transistor block comprises a plurality of NMOS transistors being arranged in series, for instance between 10 to 50 NMOS transistors. In this way the first reference current may be downscaled from smaller than 1 nA to smaller than 1 pA, which means that the first reference input current<1 nA is transformed to an output current<1 pA to reach a desired output resistance.

For symmetry reasons, the second current mirror circuit CM2 comprises a structure analogous to that of the first current mirror circuit CM1.

The second current mirror circuit CM2 comprises, for instance, a first PMOS transistor Tp1 comprising a gate electrode, a drain electrode serving as the current input terminal of the second current mirror circuit CM2, and a source electrode connectable to the pre-selected potential. Furthermore the second current mirror circuit CM2 comprises a PMOS transistor block Tpblock comprising a second PMOS transistor Tp2 and at least one further PMOS transistor, the second PMOS transistor Tp2 and the at least one further PMOS transistor being arranged in series, wherein the PMOS transistor block Tpblock comprises a gate contact Gcon coupled with the gate and drain electrodes of the first PMOS transistor Tp1, a drain contact Dcon serving as the current output terminal of the second current mirror circuit CM2, and a source contact Scon connectable to the pre-selected potential.

Alternatively the first and the second current mirror circuits CM1, CM2 may comprise other, also different, current mirror circuit structures. For example, the first and/or the second current mirror circuit CM1, CM2 may comprise a Wilson structure or a cascade structure.

Figure 3:
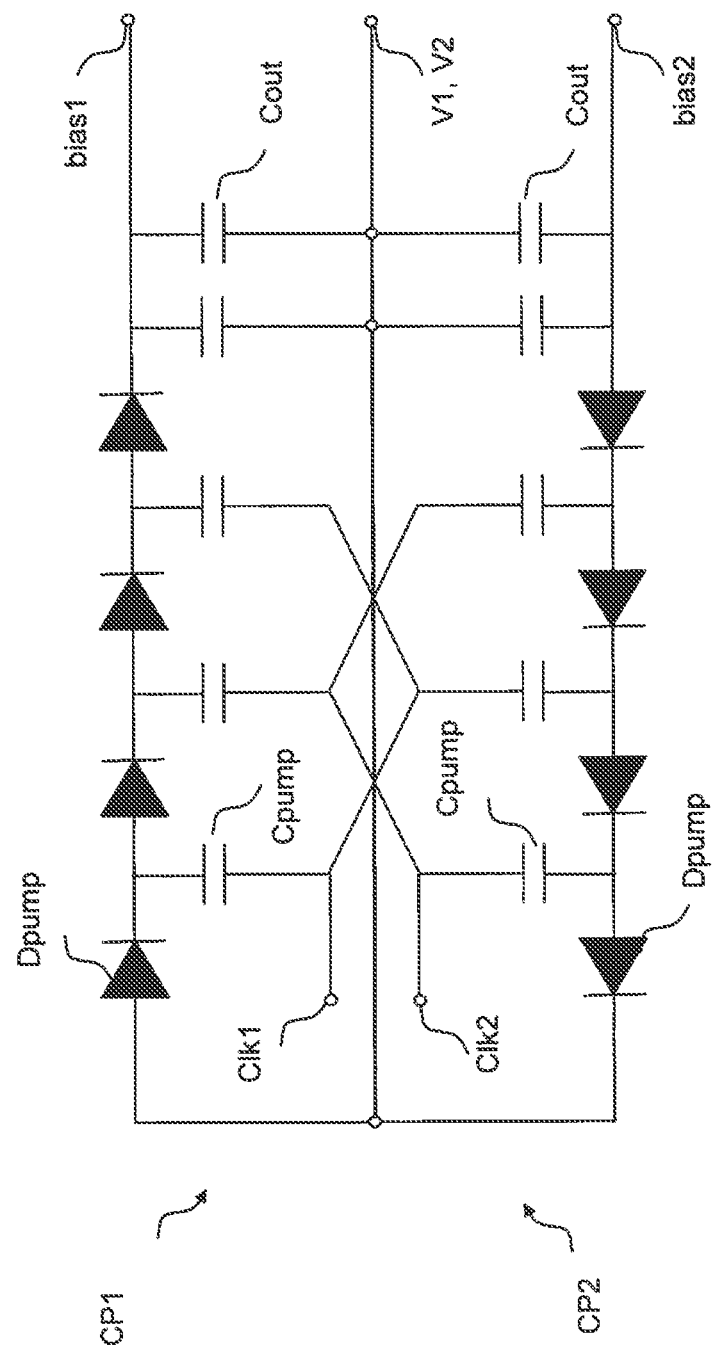

FIG. 3 shows a detailed view of an exemplary embodiment of the first and the second charge pump CP1, CP2.

Preferably, the first charge pump CP1 and/or the second charge pump CP2 is/are configured to provide the first reference current and/or the second reference current, respectively, with an absolute value equal to or smaller than 1 nA for biasing the first current mirror circuit CM1 and/or the second current mirror circuit CM2.

The first charge pump CP1 and/or the second charge pump CP2 each comprise, for instance, a multitude of identical stages, each comprising a diode Dpump and a pumping capacitor Cpump, wherein the capacitors in consecutive stages are driven by at least 2 non-overlapping clock signals Clk1, Clk2.

The pumping capacitors Cpump in consecutive stages are, for instance, driven by two complementary clock signals Clk1, Clk2. Charge is transferred from one pumping capacitor Cpump to the next at the rhythm of the clock, yielding an output voltage that can be much higher than the input voltage.

The first and second reference currents provided by the first and second charge pumps CP1, CP2 may be given in a simplified form as, respectively:

$$I\text{Ref} = (F\text{clk} * C\_\text{pump} * V cc)/N, \qquad \text{Gl. 1}$$

wherein Fclk is a frequency of the clock signals Clk1, Clk2, C_pump is the capacity of the pumping capacitor Cpump, N is the number of stages and Vcc is the power supply of the first charge pump CP1 and the second charge pump CP2. The first and the second charge pump CP1, CP2 comprises each a supply input V1, V2. For instance, the supply inputs V1, V2 of the first and second charge pump CP1, CP2 are coupled with the output of the main charge pump CP.

For instance, the respective diodes Dpump of the first and/or second charge pump CP1, CP2 comprise diode-connected NMOS transistors. The diode-connected NMOS transistors allow a charge flow only in one direction.

Therefore, the first charge pump CP1 and the second charge pump CP2 are especially arranged in a back-to-back configuration for providing the first and second reference currents for the first and second current mirror circuits CM1, CM2, respectively.

Preferably, the first and second charge pumps CP1, CP2 each comprises at least an output capacitor Cout.

The circuit structure of the first and second charge pumps CP1, CP2 allows for a very symmetrical layout design, thus insuring a compensation of the current variations due to temperature and process variation. Thus a more constant and reliable biasing of the first and second current mirror circuits CM1, CM2 is possible, which also improves the filtering performance.

The filter element FE of the charge pump arrangement 100 features a compensated biasing circuit with regard to process and temperature variations. The voltage ripple may only depend on the size of a filtering capacitor with regard to ground and may be adjusted by choosing an appropriate capacitance.

The invention claimed is:

1. An impedance circuit for a charge pump arrangement, the impedance circuit comprising:
   a device input;
   a device output;
   a first current mirror circuit with a first bias serving as a current input terminal, a first output serving as a current output terminal and a first input for coupling with a pre-selected potential;
   a first charge pump for biasing the first current mirror circuit with a first reference current, wherein the first charge pump comprises a first biasing output coupled with the first bias of the first current mirror circuit;
   a second current mirror circuit with a second bias serving as a current input terminal, a second output serving as a current output terminal and a second input for coupling with the pre-selected potential; and
   a second charge pump for biasing the second current mirror circuit with a second reference current, wherein the second charge pump comprises a second biasing output coupled with the second bias of the second current mirror circuit,
   wherein the first output of the first current mirror circuit and the second output of the second current mirror circuit are coupled with the device output, and
   wherein the first input of the first current mirror circuit and the second input of the second current mirror circuit are coupled with the device input.

2. The impedance circuit according to claim 1, wherein the first charge pump is configured to provide the first reference current with an absolute value equal to or smaller than 1 nA for biasing the first current mirror circuit.

3. The impedance circuit according to claim 1, wherein the second charge pump is configured to provide the second reference current with an absolute value equal to or smaller than 1 nA for biasing the second current mirror circuit.

4. The impedance circuit according to claim 1, wherein the first charge pump and the second charge pump are configured to provide the first reference current and the second reference current, respectively, with an absolute value equal to or smaller than 1 nA for biasing the first current mirror circuit and the second current mirror circuit, respectively.

5. The impedance circuit according to claim 1, wherein the first current mirror circuit comprises transistors of a first type of a semiconductor transistor technology and the second current mirror circuit comprises transistors of a second type of the semiconductor transistor technology.

6. The impedance circuit according to claim 5, wherein the transistors of the first type are complementary to the transistors of the second type.

7. The impedance circuit according to claim 1, wherein the first current mirror circuit and/or the second current mirror circuit is/are based on metal-oxide-semiconductor field-effect transistors (MOSFETs) configured to be operated in weak inversion.

8. The impedance circuit according to claim 1, wherein the first current mirror circuit comprises NMOS transistors and the second current mirror circuit comprises PMOS transistors.

9. The impedance circuit according to claim 1, wherein the first current mirror circuit comprises a first NMOS transistor comprising a gate electrode, a drain electrode serving as the current input terminal of the first current mirror circuit and a source electrode connectable to a pre-selected potential, and an NMOS transistor block comprising a second NMOS transistor and at least one further NMOS transistor, the second NMOS transistor and the at least one further NMOS transistor being arranged in series, and wherein the NMOS transistor block comprises a gate contact coupled with the gate and drain electrodes of the first NMOS transistor, a drain contact serving as the current output terminal of the first current mirror circuit, and a source contact connectable to the pre-selected potential.

10. The impedance circuit according to claim 1, wherein the second current mirror circuit comprises a first PMOS transistor comprising a gate electrode, a drain electrode serving as the current input terminal of the second current mirror circuit and a source electrode connectable to the pre-selected potential, and a PMOS transistor block comprising a second PMOS transistor and at least one further PMOS transistor, the second PMOS transistor and the at least one further PMOS transistor being arranged in series, and wherein the PMOS transistor block comprises a gate contact coupled with the gate and drain electrodes of the first PMOS transistor, a drain contact serving as the current output terminal of the second current mirror circuit, and a source contact connectable to the pre-selected potential.

11. The impedance circuit according to claim 1, wherein each of the first charge pump and/or the second charge pump comprises a plurality of identical stages, and wherein each stage comprises a diode and a pumping capacitor.

12. The impedance circuit according to claim 11, wherein the capacitors in consecutive stages are driven by at least two non-overlapping clock signals.

13. A charge pump arrangement comprising:
   a main charge pump configured to provide a given output voltage; and
   a filter element configured to filter the output voltage of the main charge pump,
   wherein the filter element comprises an impedance circuit according to claim 12.

14. An impedance circuit for a charge pump arrangement, the impedance circuit comprising:
   a first current mirror circuit with a first bias serving as a current input terminal, a first output serving as a current output terminal and a first input for coupling with a pre-selected potential;
   a first charge pump for biasing the first current mirror circuit with a first reference current, wherein the first charge pump comprises a first biasing output coupled with the first bias of the first current mirror circuit;

a second current mirror circuit with a second bias serving as a current input terminal, a second output serving as a current output terminal and a second input for coupling with the pre-selected potential; and a second charge pump for biasing the second current mirror circuit with a second reference current, wherein the second charge pump comprises a second biasing output coupled with the second bias of the second current mirror circuit, wherein the first charge pump is configured to provide the first reference current with an absolute value equal to or smaller than 1 nA for biasing the first current mirror circuit.

15. The impedance circuit according to claim 14, wherein the second charge pump is configured to provide the second reference current with an absolute value equal to or smaller than 1 nA for biasing the second current mirror circuit.

16. The impedance circuit according to claim 14, wherein the first current mirror circuit comprises a first NMOS transistor comprising a gate electrode, a drain electrode serving as the current input terminal of the first current mirror circuit and a source electrode connectable to a pre-selected potential, and an NMOS transistor block comprising a second NMOS transistor and at least one further NMOS transistor, the second NMOS transistor and the at least one further NMOS transistor being arranged in series, and wherein the NMOS transistor block comprises a gate contact coupled with the gate and drain electrodes of the first NMOS transistor, a drain contact serving as the current output terminal of the first current mirror circuit, and a source contact connectable to the pre-selected potential.

17. The impedance circuit according to claim 14, wherein the second current mirror circuit comprises a first PMOS transistor comprising a gate electrode, a drain electrode serving as the current input terminal of the second current mirror circuit and a source electrode connectable to the pre-selected potential, and a PMOS transistor block comprising a second PMOS transistor and at least one further PMOS transistor, the second PMOS transistor and the at least one further PMOS transistor being arranged in series, and wherein the PMOS transistor block comprises a gate contact coupled with the gate and drain electrodes of the first PMOS transistor, a drain contact serving as the current output terminal of the second current mirror circuit, and a source contact connectable to the pre-selected potential.

18. The impedance circuit according to claim 14, wherein each of the first charge pump and/or the second charge pump comprises a plurality of identical stages, and wherein each stage comprises a diode and a pumping capacitor.

19. An impedance circuit for a charge pump arrangement, the impedance circuit comprising:

a first current mirror circuit with a first bias serving as a current input terminal, a first output serving as a current output terminal and a first input for coupling with a pre-selected potential;

a first charge pump for biasing the first current mirror circuit with a first reference current, wherein the first charge pump comprises a first biasing output coupled with the first bias of the first current mirror circuit;

a second current mirror circuit with a second bias serving as a current input terminal, a second output serving as a current output terminal and a second input for coupling with the pre-selected potential; and a second charge pump for biasing the second current mirror circuit with a second reference current, wherein the second charge pump comprises a second biasing output coupled with the second bias of the second current mirror circuit, wherein the first current mirror circuit comprises a first NMOS transistor comprising a gate electrode, a drain electrode serving as the current input terminal of the first current mirror circuit and a source electrode connectable to a pre-selected potential, and an NMOS transistor block comprising a second NMOS transistor and at least one further NMOS transistor, the second NMOS transistor and the at least one further NMOS transistor being arranged in series, and wherein the NMOS transistor block comprises a gate contact coupled with the gate and drain electrodes of the first NMOS transistor, a drain contact serving as the current output terminal of the first current mirror circuit, and a source contact connectable to the pre-selected potential.

20. The impedance circuit according to claim 19, wherein the second current mirror circuit comprises a first PMOS transistor comprising a gate electrode, a drain electrode serving as the current input terminal of the second current mirror circuit and a source electrode connectable to the pre-selected potential, and a PMOS transistor block comprising a second PMOS transistor and at least one further PMOS transistor, the second PMOS transistor and the at least one further PMOS transistor being arranged in series, and wherein the PMOS transistor block comprises a gate contact coupled with the gate and drain electrodes of the first PMOS transistor, a drain contact serving as the current output terminal of the second current mirror circuit, and a source contact connectable to the pre-selected potential.

* * * * *